(12) United States Patent
Zhang et al.

(10) Patent No.: US 12,493,051 B2
(45) Date of Patent: Dec. 9, 2025

(54) AUTOMATIC SENSOR SCREENING AND DETECTION DEVICE

(71) Applicants: Shaoda Zhang, Guangdong (CN);
Xingyu Zheng, Guangdong (CN);
Zigang Shi, Guangdong (CN)

(72) Inventors: Shaoda Zhang, Guangdong (CN);
Xingyu Zheng, Guangdong (CN);
Zigang Shi, Guangdong (CN)

( * ) Notice: Subject to any disclaimer, the term of this patent is extended or adjusted under 35 U.S.C. 154(b) by 348 days.

(21) Appl. No.: 17/962,550

(22) Filed: Oct. 10, 2022

(65) Prior Publication Data
US 2023/0333132 A1    Oct. 19, 2023

(30) Foreign Application Priority Data
Apr. 14, 2022 (CN) .......................... 202210387886.4

(51) Int. Cl.
*G01N 35/10* (2006.01)
*G01N 35/00* (2006.01)

(52) U.S. Cl.
CPC ... *G01N 35/1004* (2013.01); *G01N 35/00663* (2013.01); *G01N 2035/00683* (2013.01)

(58) Field of Classification Search
None
See application file for complete search history.

(56) References Cited

U.S. PATENT DOCUMENTS

| | | | | |
|---|---|---|---|---|
| 11,112,418 | B1 * | 9/2021 | Holmes | G01N 15/1434 |
| 2016/0299165 | A1 * | 10/2016 | Zhou | G01N 33/50 |
| 2017/0219614 | A1 * | 8/2017 | Cook | G01N 35/1065 |
| 2019/0049474 | A1 * | 2/2019 | Nishikawa | G01N 35/00722 |
| 2022/0099694 | A1 * | 3/2022 | Bergbaur | B01L 3/021 |

FOREIGN PATENT DOCUMENTS

| | | | | |
|---|---|---|---|---|
| CN | 206613800 U | * 11/2017 | | |
| CN | 107520432 A | * 12/2017 | | B22D 31/005 |
| CN | 211757263 U | * 10/2020 | | |

OTHER PUBLICATIONS

CN 107520432 with english abstract (Year: 2017).*
CN 206613800 with English abstract (Year: 2017).*
CN 2011757263 with English Abstract (Year: 2020).*

* cited by examiner

*Primary Examiner* — Mark A Shabman (57) ABSTRACT

An automatic sensor screening and detection device, including a box, transfer mechanisms arranged in the box, a test apparatus, a cleaning apparatus, and an air showering apparatus. The transfer mechanisms are configured to sequentially move the detection electrode plate to a clamping piece carrier tray, the test apparatus, the cleaning apparatus, the air showering apparatus, and the clamping piece carrier tray. The test apparatus is provided with a liquid immersion tank and a test board. The detection electrode plate is immersed in the liquid immersion tank. Test probes arranged on the test board are in contact with the detection electrode plate. The cleaning nozzles arranged on the cleaning apparatus are aligned with the detection electrode plate to perform spray cleaning with purified water. The air showering micro-holes arranged on the air showering apparatus are aligned with the detection electrode plate to perform air showering drying.

8 Claims, 5 Drawing Sheets

AUTOMATIC SENSOR SCREENING AND DETECTION DEVICE

BACKGROUND OF THE INVENTION

The present disclosure relates to the technical field of sensor detection devices, in particular to an automatic sensor screening and detection device.

With the popularization of medical awareness and the advancement of science and technology, medical health has gradually been paid more and more attention by people. Most modern diseases cause chronic damage and dysfunction to various tissues, especially the eyes, kidneys, heart, blood vessels, and nerves. During treatment of these chronic diseases, it is very necessary to monitor blood glucose of patients. In various sensors, an electrochemical biosensor is widely used in medical health treatments due to the advantages of simplicity, convenience, low price, high sensitivity, etc.

According to the use principle of an existing electrical biosensor, in general, a redox reaction is produced in a liquid to be tested by means of an electrochemical reaction of an electron mediator, the electron mediator transfers electrons removed from a reduced state to an electrode plate to generate a current signal, the concentration of a substance to be detected is determined through the magnitude of the current signal, and a series of biological indicators are obtained to determine the physical condition of a patient.

As a result, the electrode plate is usually detected in order to ensure the accuracy and precision of detection during production. During the detection, the electrode plate needs to be immersed in a standard detection liquid to determine and obtain the corresponding current signal, and whether the electrode plate is qualified is determined by comparing detection results. Therefore, a detection and screening device for the electrode plate is needed.

BRIEF SUMMARY OF THE INVENTION

In order to quickly obtain the product quality of an electrode plate product, the present disclosure provides an automatic sensor screening and detection device, which can quickly and automatically obtain electrical signal data of standard detection liquids corresponding to electrode plates in batches, so as to realize the detection of the electrode plates.

A technical solution of the present disclosure is as follows:

An automatic sensor screening and detection device, including: a box and
  transfer mechanisms arranged in the box, the transfer mechanisms being configured to drive a detection electrode plate to move in the box, the transfer mechanisms clamp the detection electrode plate fixed to a clamping piece carrier tray, and sequentially move the detection electrode plate a test apparatus, a cleaning apparatus, an air showering apparatus, and finally the detection electrode plate returns to the clamping piece carrier tray;
  the test apparatus provided with a liquid immersion tank and a test board, during testing, the detection electrode plate is configured to be immersed in the liquid immersion tank, during clamping, test probes arranged on the test board being in contact with the detection electrode plate, and the test probes being connected to a computer via shielded wires;
  the cleaning apparatus provided with a cleaning tank and cleaning nozzles, the cleaning nozzles being aligned with the detection electrode plate to perform spray cleaning with purified water; and
  the air showering apparatus provided with an air showering tank and air showering micro-holes, the air showering micro-holes being aligned with the detection electrode plate to perform air showering drying.

In the above automatic sensor screening and detection device, the transfer mechanisms include a vertical transfer mechanism, a horizontal transfer mechanism, and a clamping transfer mechanism, the clamping transfer mechanism is arranged on the horizontal transfer mechanism, the horizontal transfer mechanism is arranged on the vertical transfer mechanism, and the transfer mechanisms are configured to drive the detection electrode plate to move in the box in a three-dimensional space.

Further, the box is provided with a profile steel frame, the vertical transfer mechanism is arranged on the profile steel frame, the vertical transfer mechanism includes a vertical guide rail, a vertical transfer screw rod, and a vertical transfer slide rail, the vertical transfer screw rod is connected to a first vertical transfer slide block, the first vertical transfer slide block is connected to one end of a moving plate, an end part of the vertical transfer screw rod is connected to a vertical transfer motor, and another end of the moving plate is slidably connected to the vertical transfer slide rail via a second vertical transfer slide block.

Further, the moving plate is arranged on the horizontal transfer mechanism, the moving plate is provided with a horizontal guide rail and a horizontal transfer screw rod, a horizontal transfer slide block is arranged on the horizontal transfer screw rod, one end of the horizontal transfer screw rod is connected to a horizontal transfer motor, and the horizontal transfer slide block is configured to slides along the horizontal guide rail.

Further, a clamping plate transfer mechanism is fixed to the horizontal transfer slide block of the horizontal transfer mechanism.

In the above automatic sensor screening and detection device, the detection electrode plate is driven to move via the clamping plate transfer mechanism in the transfer mechanisms, the clamping plate transfer mechanism includes a clamping assembly and an up-and-down movement assembly, the clamping assembly is configured to clamp the detection electrode plate, and the up-and-down movement assembly is configured to drive the clamping assembly to move up and down.

Further, the clamping assembly includes clamping arms and clamping cylinders arranged at two ends, output ends of the clamping cylinders are respectively connected to the clamping arms below, and the clamping arms are configured to clamp or loosen the detection electrode plate.

Further, the clamping assembly is arranged on a clamping base plate, the up-and-down movement assembly includes a moving wing plate, a moving motor, and a moving screw rod, the clamping base plate is connected to the moving wing plate, the moving wing plate is connected to a moving slide block on a moving slide rail, the moving screw rod is connected to a moving block, an output shaft of the moving motor is provided with a first synchronous wheel, the moving screw rod is connected to a second synchronous wheel, and the first synchronous wheel is linked to the second synchronous wheel via a synchronous belt.

In the above automatic sensor screening and detection device, the detection electrode plate is placed in electrode fixing clips, fixing columns are arranged on the electrode fixing clips, the fixing columns are inserted into insertion holes of the detection electrode plate, a strong magnet is arranged between the electrode fixing clips, and the strong magnet is configured to adsorb the detection electrode plate.

Further, a plurality of clamping plate grooves are formed in the clamping piece carrier tray inside the box, the electrode fixing clips are inserted into the clamping plate grooves, a positioning guide column and an auxiliary contour positioning block are arranged inside the box, and the clamping piece carrier tray is connected to the positioning guide column and is placed inside a space defined by the auxiliary contour positioning block.

In the above automatic sensor screening and detection device, an auxiliary clamping plate and the test board are respectively arranged on opposite sides of the liquid immersion tank, both the auxiliary clamping plate and the test board are connected to test slide structures, each of the slide structures comprises a test slide block and a test slide rail, the test board and the auxiliary clamping plate are respectively fixed to the test slide blocks and the test slide rails via test fixing plates, and the test slide blocks are configured to slide along the test slide rails, thereby driving the fixing plates and the test board and the auxiliary clamping plate arranged on the fixing plates to perform reciprocating motion.

In the above automatic sensor screening and detection device, the test apparatus is provided with a code scanning input unit, the code scanning input unit is connected to the computer, the detection electrode plate is configured to be placed in electrode fixing clips, each of the electrode fixing clips is provided with an identification code, and the code scanning input unit is arranged oriented towards a position where the identification code is located when the corresponding electrode fixing clip is placed in the liquid immersion tank.

In the above automatic sensor screening and detection device, the liquid immersion tank is provided with a liquid level sensor and a liquid replenishment apparatus, the liquid replenishment apparatus includes a liquid inlet tube and a liquid storage tank connected to the liquid immersion tank, a control valve is arranged between the liquid inlet tube and the liquid storage tank, and both the control valve and the liquid level sensor are connected to the computer.

In the above automatic sensor screening and detection device, the cleaning apparatus includes the cleaning tank and the plurality of cleaning nozzles arranged on two sides of the cleaning tank, the cleaning nozzles are connected to a purified water storage tank, a control valve is arranged between the purified water storage tank and each of the cleaning nozzles, and the computer is connected to the control valve.

In the above automatic sensor screening and detection device, the air showering apparatus includes the air showering tank and the plurality of air showering micro-holes formed in two sides of the air showering tank, the air showering micro-holes are connected to a fan, and the computer is connected to the fan.

In the above automatic sensor screening and detection device, recovery pipelines are arranged at the bottom of the cleaning tank and at the bottom of the air showering tank.

The present disclosure according to the above solution has the beneficial effects that the present disclosure realizes automatic detection, cleaning, and drying processes for the electrode plate of a sensor, such that a state of the electrode plate remains unchanged before and after detection; the electrode plate is moved by the transfer mechanisms, and the corresponding moving structure is controlled to make the test board contact with the electrode plate for detection; detection information is sent to the computer via the shielded wire to realize a detection function; and a high level of automation is realized, and a batch detection process can be completed, such that the production efficiency of the product is improved.

BRIEF DESCRIPTION OF THE DRAWINGS

In order to more clearly illustrate the technical solution in the embodiments of the present disclosure, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts.

In reference numbers:
- 11: upper box; 12: lower box; 13: control button; 14: display; 15: keyboard and mouse; 16: operating display terminal; 17: temperature controller; 18: clamping piece carrier tray; 19: auxiliary contour positioning block;
- 21: vertical transfer mechanism; 211: vertical guide rail; 212: vertical transfer screw rod; 213: vertical transfer slide rail; 214: first vertical transfer slide block; 215: second vertical transfer slide block; 216: vertical transfer motor; 217: vertical transfer drag chain;
- 22: horizontal transfer mechanism; 221: horizontal guide rail; 222: horizontal transfer screw rod; 223: horizontal transfer motor; 224: horizontal transfer drag chain;
- 23: clamping transfer mechanism; 231: moving wing plate; 232: moving slide rail; 233: moving screw rod; 234: moving motor; 235: first synchronous wheel; 236: second synchronous wheel;
- 24: profile steel frame; 25: moving plate; 26: clamping cylinder; 27: clamping arm;
- 3: test apparatus; 31: liquid immersion tank; 32: test board; 33: auxiliary clamping plate; 34: test slide block; 35: test slide rail; 36: code scanning input unit; 37: liquid storage tank; 38: liquid inlet tube;
- 4: cleaning apparatus; 41: cleaning tank; 42: cleaning nozzle;
- 5: air showering apparatus; 51: air showering tank; 52: air showering micro-hole;
- 6: electrode fixing clip; and 61: detection electrode plate.

DETAILED DESCRIPTION OF THE INVENTION

In order to make the technical problem to be solved by the present disclosure and the technical solution and beneficial effects of the present disclosure clearer, the present disclosure will be further described in detail below with reference to the accompanying drawings and the embodiments. It should be understood that the specific embodiments described herein are merely used to explain the present disclosure, but not to limit the present disclosure.

It should be noted that when a component is referred to as being "fixed" to or "arranged" on or "connected" to another component, it may be directly or indirectly positioned on another component. The orientations or positions indicated by the terms "upper", "lower", "left", "right", "front", "back", "vertical", "horizontal", "inner", "outer" and the like are based on the orientations or positions shown in the accompanying drawings, only facilitate the description, and should not be construed as a limitation to this technical solution. The terms "first", "second" and the like are only used for facilitating the description, and should not be construed as indicating or implying relative importance or implicitly indicating the number of technical features. "A plurality of" means two or more, unless expressly and specifically limited otherwise.

Figure 1:
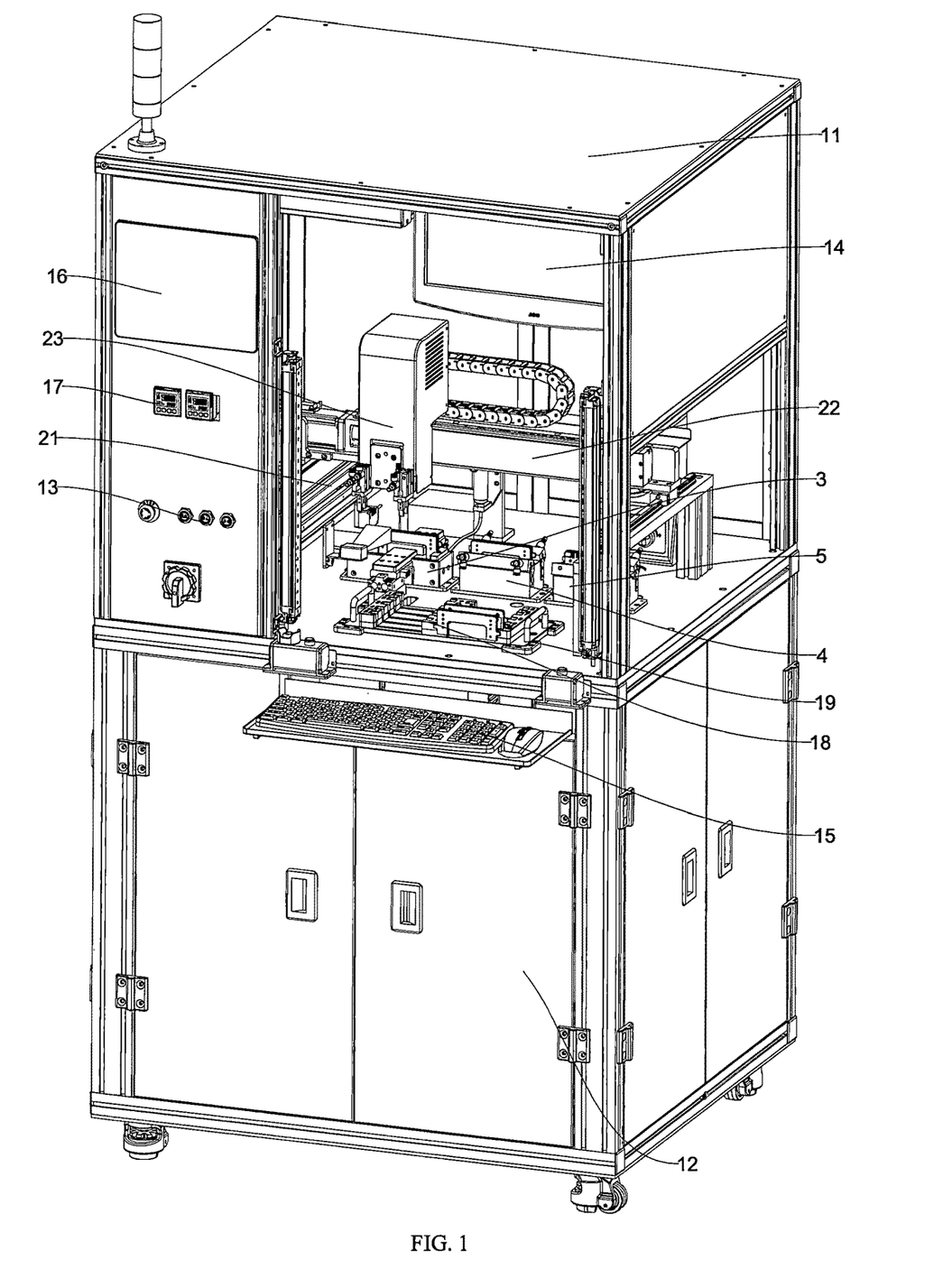
FIG. 1 is a schematic structural diagram of the present disclosure.

As shown in FIG. 1, an automatic sensor screening and detection device is in the shape of a box that is divided into an upper box 11 and a lower box 12.

Figure 2:
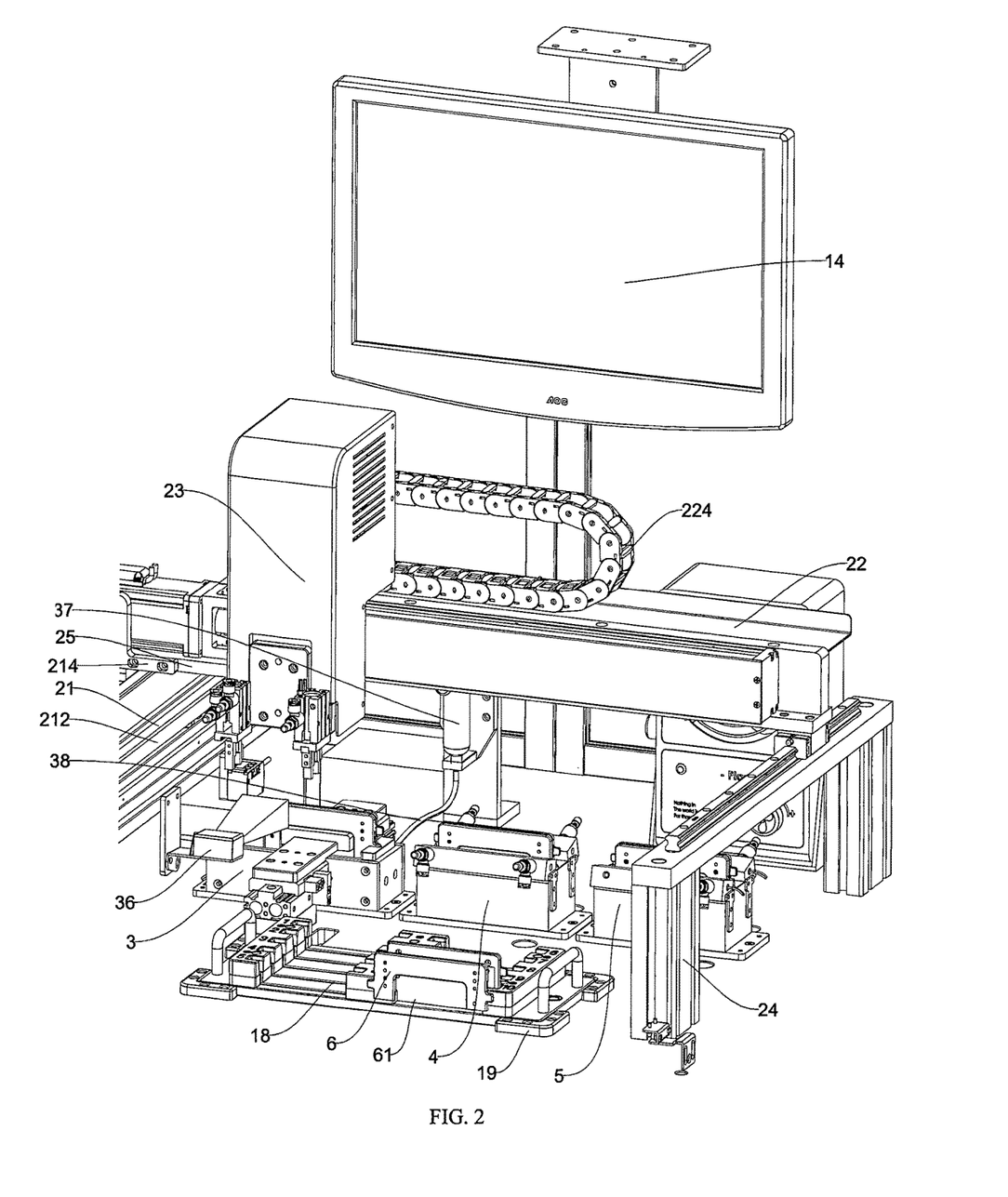
FIG. 2 is a partial enlarged view of FIG. 1 after removal of part of a panel and a frame structure.

As shown in FIG. 2, the upper box 11 is a working space for sensor screening and detection, in which all mechanical mechanisms and control mechanisms for electrode plate detection are arranged. The mechanical mechanisms in screening and detection processes are electrically connected in the lower box 12. Various electronic components, control modules, and functional module, and gas tanks for transfer mechanisms, detection liquid containers used in the detection process, and the like are fixed inside the lower box body. In the lower box 12, according to a maintenance frequency and a replenishment frequency, the electronic components, including a power switch, a power control and the like, are fixed to a vertically arranged plate-shaped wiring frame, the control modules are separately arranged inside a box, and the gas tanks, the detection liquid containers and the like are placed behind the wiring frame. A box door is designed in the front of the lower box 12, and a second box door may also be arranged in the back for convenience. The mechanical mechanisms are physically separated from the structures such as the electronic components and are intensively arranged together with similar structures, such that the overall structure of the device is clearly hierarchical, which is advantageous to labor division production and assembly in an earlier stage and maintenance and repair in a later stage.

Left, right, back, and upper parts of the upper box 11 are enclosed by plates, and a lower part thereof is an upper surface of the exterior of the lower box 12; the mechanical mechanisms for detection are fixed to the exterior of the upper surface of the lower box 12 via screws and the like; a left side of a front part is provided with an operating display terminal 16, a temperature controller 17, and control buttons 13 from top to bottom; a right side of the front part is open or is provided with a transparent plate for separation; and an input port is arranged below the transparent plate to make a clamping piece carrier tray 18 for placing the detection electrode plate 61 enter the interior of the upper box 11. The exterior of a right side of the front part of the upper box 11 is provided with a push-pull plate, the upper part is provided with a keyboard and mouse 15, a corresponding computer host is arranged inside the lower box 12, and a display 14 is fixed to an upper surface of the interior of the upper box 11 via a hanging component.

In this embodiment, the control buttons 13 include a power-on button, a power-off button, a stop button, a reset button, and an emergency stop button.

In this embodiment, a three-color alarm light is arranged at the upper part of the upper box 11.

Figure 3:
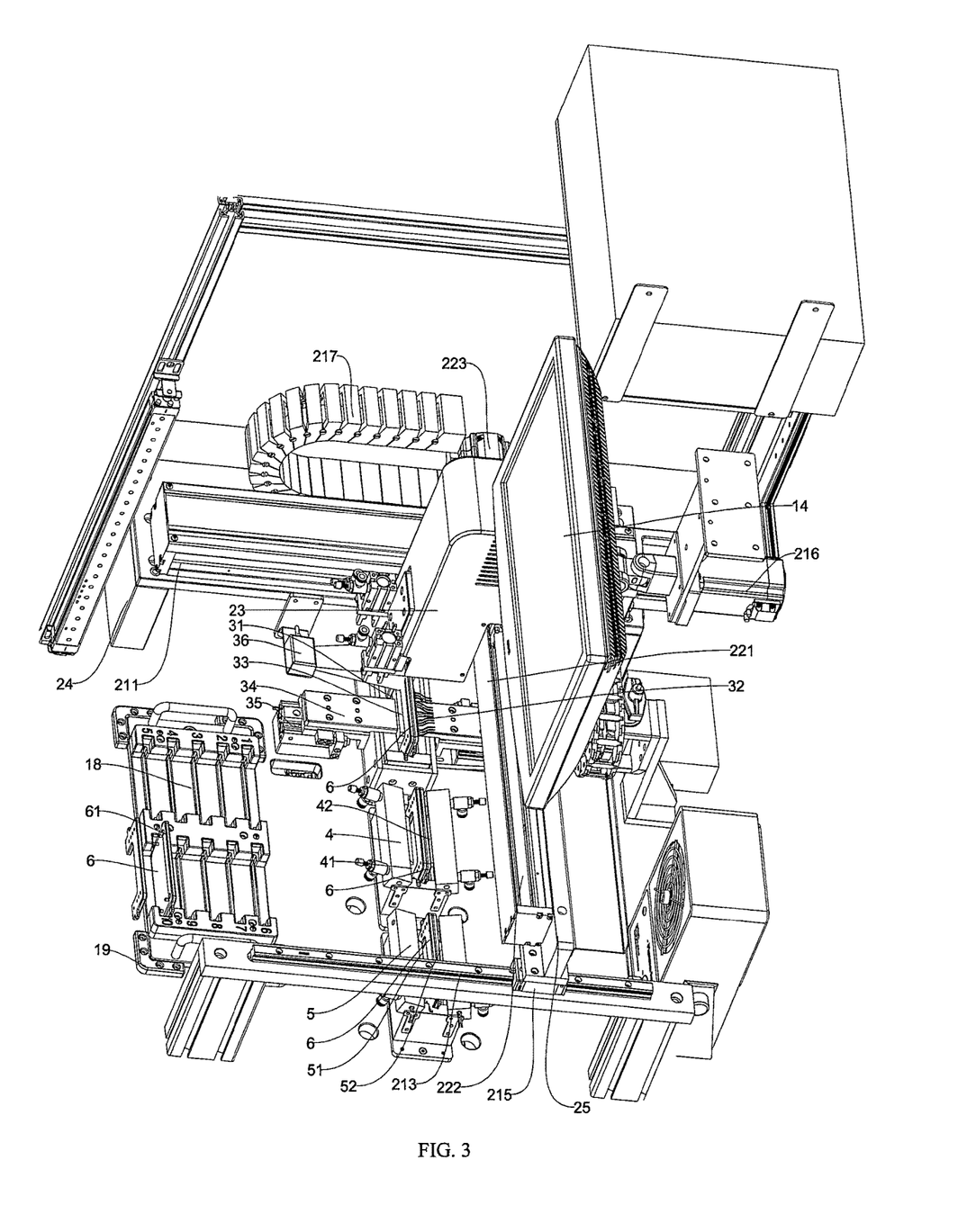
FIG. 3 is another schematic local structural diagram after removal of part of the panel and the frame structure in the present disclosure.
Figure 4:
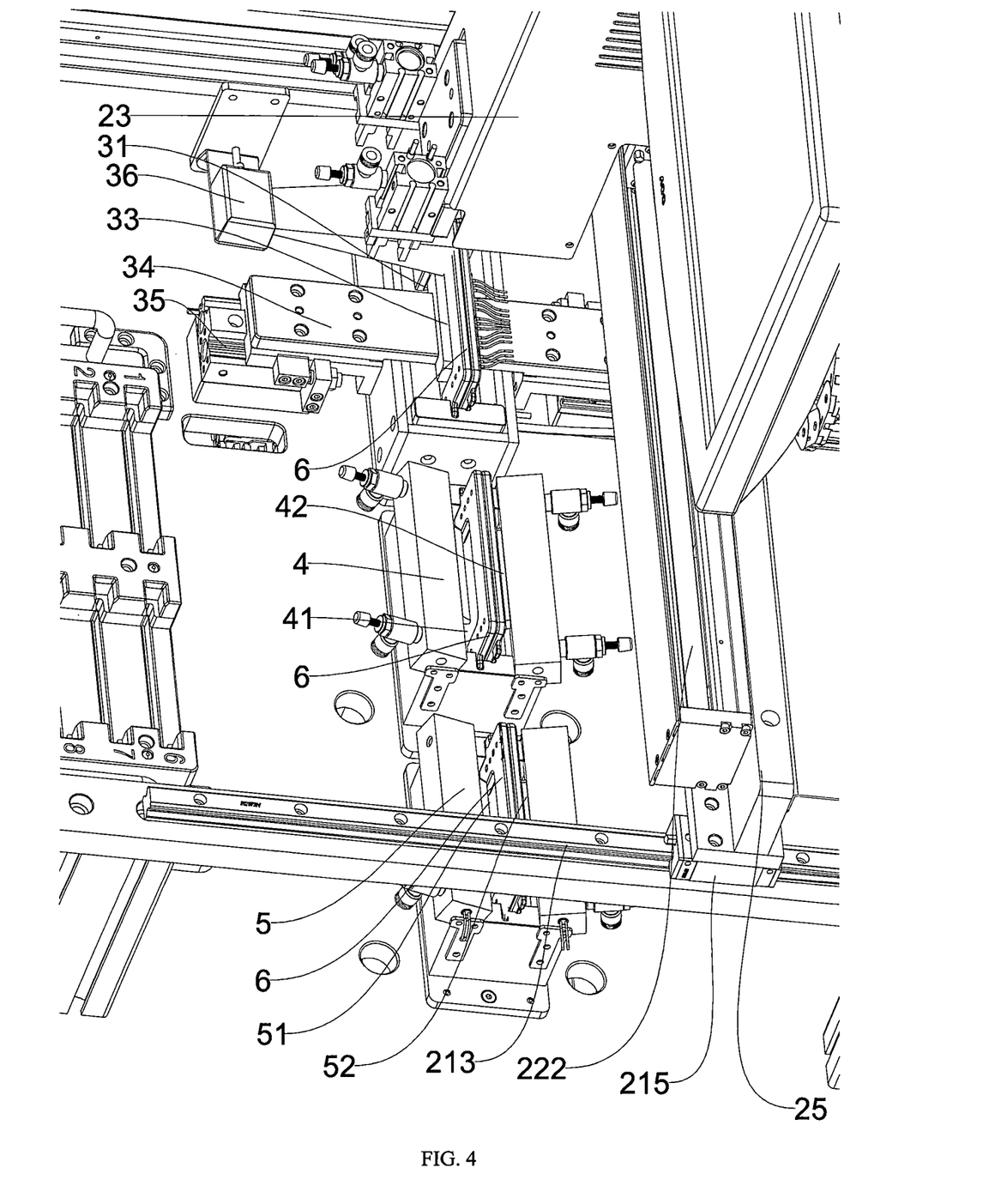
FIG. 4 is a partial enlarged view of FIG. 3.

As shown in FIGS. 2, 3, and 4, the transfer mechanisms, which are respectively a horizontal transfer mechanism 22 and a vertical transfer mechanism 21, are arranged in the upper box 11 in a horizontal direction and a vertical direction; and in addition, a clamping plate transfer mechanism for moving the detection electrode plate 61 is further arranged.

1. Vertical Transfer Mechanism 21

The entire transfer mechanism is erected by a profile steel frame 24, where the profile steel frame 24 includes door-like structures arranged on left and right sides of the upper box 11, and a moving plate 25 for connecting the door-like structures on the two sides. A vertical guide rail 211 and a vertical transfer screw rod 212 are arranged on an upper surface of the door-like structure on the left side, and a vertical transfer slide rail 213 is arranged on an upper surface of the door-like structure on the right side. The vertical transfer screw rod 212 is connected to a first vertical transfer slide block 214, the first vertical transfer slide block 214 is connected to one end of the moving plate 25 or is an extension structure at one end of the moving plate 25, an end part of the vertical transfer screw rod 212 is connected to a vertical transfer motor 216, and another end of the moving plate 25 is slidably connected to the vertical transfer slide rail 213 via a second vertical transfer slide block 215. When the vertical transfer motor 216 rotates, it drives the vertical transfer screw rod 212 to rotate, and the first vertical transfer slide block 214 is driven by the vertical transfer screw rod 212 to slide along the vertical guide rail 211, such that one moving end of the moving plate 25 moves along the vertical guide rail 211 to drive another end of the moving plate 25 to slide along the vertical transfer slide rail 213, which means that the entire moving plate 25 moves inside the upper box 11 along a vertical direction. The first vertical transfer slide block 214 is connected with a vertical transfer drag chain 217.

2. Horizontal Transfer Mechanism 22

The horizontal transfer mechanism 22 is arranged on the moving plate 25. When the moving plate 25 is driven by the vertical transfer mechanism 21 to move along the vertical direction, the horizontal transfer mechanism 22 arranged on the moving plate 25 is driven to move in the vertical direction. The horizontal transfer mechanism 22 is similar to the vertical mechanism. A horizontal guide rail 221 and a horizontal transfer screw rod 222 are arranged in the front of the moving plate 25. A horizontal transfer slide block is arranged on the horizontal transfer screw rod 222. One end of the horizontal transfer screw rod 222 is connected to a horizontal transfer motor 223. When the horizontal transfer motor 223 rotates, it drives the horizontal transfer screw rod 222 to rotate, such that the horizontal transfer slide block is configured to slides along the horizontal guide rail 221. The horizontal transfer mechanism 22 is further provided with a horizontal transfer drag chain 224. The horizontal transfer drag chain 224 is connected to the horizontal transfer slide block, or is an extension structure connected to the horizontal transfer slide block, such as a structural component fixed to the horizontal transfer slide block.

3. Clamping Plate Transfer Mechanism

The clamping plate transfer mechanism is fixed to the horizontal transfer slide block. When the horizontal transfer slide block moves in the horizontal direction along the horizontal guide rail 221 on a surface of the moving plate 25 under the action of the horizontal transfer motor 223, the entire clamping plate transfer mechanism also moves in the horizontal direction accordingly. The clamping plate transfer mechanism includes a clamping assembly and an up-and-down movement assembly.

(1) Clamping Assembly

Figure 5:
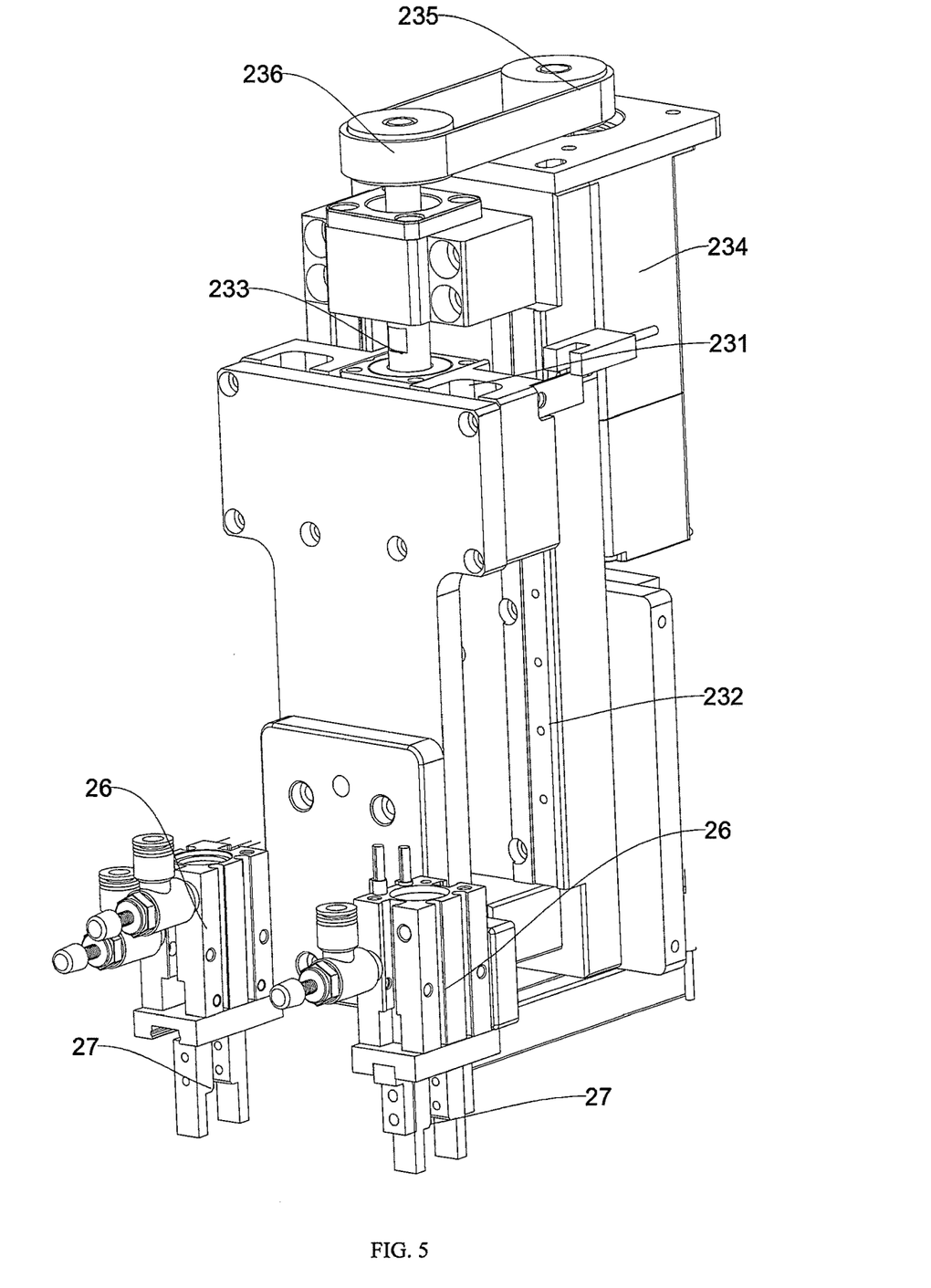
FIG. 5 is a schematic structural diagram of a clamping transfer mechanism.

The clamping assembly includes clamping pieces at two ends. Electrode fixing clips 6 are clamped by opening and closing of the clamping pieces. The opening and closing of the clamping pieces is powered by clamping cylinders 26. An output end of each clamping cylinder 26 are respectively connected to clamping arms 27 at left and right ends of a lower part thereof to form cylinder clamping jaws. The tightness of clamping is controlled by adjusting the gas flow rate of the clamping cylinder 26. In this way, two ends of each electrode fixing clip 6 are respectively clamped by the clamping pieces at the two ends, such that the electrode fixing clip 6 moves accordingly.

(2) Up-and-Down Movement Assembly

As shown in FIG. 5, the clamping cylinders 26 of the clamping assembly are fixed to a clamping base plate, and an upper part of the clamping base plate is fixedly connected to a moving wing plate 231. The moving wing plate 231 is in a shape with concave middle and two convex ends, the middle of the moving wing plate 231 is fixedly connected to a moving block, and the two ends thereof are fixedly connected to a moving slide block on a moving slide rail 232. The moving block is connected to a moving screw rod 233 via threads, both the moving slide rail 232 and the moving screw rod 233 are arranged on one side of a moving base plate, another side of the moving base plate is provided with a moving motor 234, an output shaft of the moving motor 234 faces upward, an end part of the output shaft is provided with a first synchronous wheel 235, an upper end of the moving screw rod 233 is connected to a second synchronous wheel 236, and the first synchronous wheel 235 is linked to the second synchronous wheel 236 via a synchronous belt.

In this way, when the moving motor 234 rotates, it drives the first synchronous wheel 235 to rotate; the first synchronous wheel 235 drives the second synchronous wheel 236 to rotate via the synchronous belt; the second synchronous wheel 236 drives the moving screw rod 233 to rotate, and the moving screw rod 233 rotates to make the moving block move up and down along the moving screw rod 233, so the moving wing plate 231 moves up and down; and two ends of the moving wing plate 231 move up and down along the moving slide rail 232 via a moving slide block to drive the clamping base plate fixed to the moving wing plate 231 to move up and down, thereby changing the positions of the clamping pieces to ensure that the clamping pieces can drive the electrode fixing clips 6 to move up and down.

The electrode fixing clips 6 can move in the upper box 11 via the above three transfer mechanisms, namely, the vertical transfer mechanism 21, the horizontal transfer mechanism 22, and the clamping plate transfer mechanism. In general, the horizontal transfer mechanism 22 is arranged on the vertical transfer mechanism 21, the clamping plate transfer mechanism is arranged on the horizontal transfer mechanism 22 and is configured to complete movements in different directions one by one, the vertical transfer mechanism 21 is configured to complete movement in the vertical direction on a horizontal plane, the horizontal transfer mechanism 22 is configured to complete movement in the horizontal direction on the horizontal plane, and the clamping plate transfer mechanism is configured to complete up-and-down movement perpendicular to the horizontal plane, such that the three transfer mechanisms jointly complete movement in a three-dimensional space.

The detection electrode plate 61 is placed on a clamping piece carrier tray 18, and the clamping piece carrier tray 18 is arranged on a right side of the upper box 11. A positioning guide column and an auxiliary contour positioning block 19 are arranged at a position, where the clamping piece carrier tray 18 is arranged, in the upper box 11. The clamping piece carrier tray 18 is connected to the positioning guide column and is placed inside a space defined by the auxiliary contour positioning block 19, such that an edge of the clamping piece carrier tray 18 is attached to an inner surface of the auxiliary contour positioning block 19. The position of the clamping piece carrier tray 18 is accurately determined by the positioning guide column and the auxiliary contour positioning block 19, which can provide accurate positioning for the movement of the transfer mechanisms to realize automatic operation of a system.

A plurality of clamping plate grooves are formed in the clamping piece carrier tray 18, and the electrode fixing clips 6 are fixedly inserted into the clamping plate grooves. The detection electrode plate 61 is embedded in inner grooves of the electrode fixing clips 6, fixing columns are arranged on the electrode fixing clips 6, and the fixing columns are inserted into to insertion holes of the detection electrode plate 61, such that the detection electrode plate 61 can be stably fixed in the electrode fixing clips 6. Usually, one detection electrode plate 61 is fixed by using two electrode fixing clips 6, and the fixing column of one of the electrode fixing clips 6 passes through the detection electrode plate 61 and then is connected to the other one of the electrode fixing clips 6 to fix the detection electrode plate 61. In addition, a strong magnet is further arranged at a position where the electrode fixing clips 6 clamp the detection electrode plate 61, and the detection electrode plate 61 can be stably and flatly fixed on the electrode fixing clips 6 by attraction of the strong magnet. Each electrode fixing clip 6 is in the shape of an arch, and a middle and a lower part thereof are hollow to expose a circuit connection position of the detection electrode plate 61. Two ends of each electrode fixing clip 6 are provided with protrusions, and the protrusion of one of the electrode fixing clips 6 is higher than the protrusion of the other one of the electrode fixing clips 6, one of the protrusions is configured for positioning during placement of the detection electrode plate 61, and the other one of the protrusions is configured for clamping of the transfer mechanisms.

A clamping transfer mechanism 23 is driven by the vertical transfer mechanism 21 and the horizontal transfer mechanism 22 to clamp the electrode fixing clips 6 fixed to the clamping piece carrier tray 18 according to a predetermined moving route; then the electrode fixing clips 6 are moved and inserted into a test station of a test apparatus 3, and the clamping transfer mechanism 23 stays above the test apparatus 3; after a test is completed, the electrode fixing clips 6 are moved down and clamped again, the electrode fixing clips 6 are moved, and the electrode fixing clips 6 are inserted into a cleaning station of the cleaning apparatus 4; the electrode fixing clips are moved up and stay above the cleaning apparatus 4; after cleaning is completed, the above actions are repeated, and the electrode fixing clips 6 are inserted into an air showering station of the air showering apparatus 5; after air showering is completed, the electrode fixing clips 6 are moved down to be clamped out; and finally the electrode fixing clips return to the clamping piece carrier tray 18, and the electrode fixing clips 6 are inserted into the original clamping plate grooves.

In the above process, the test apparatus 3, the cleaning apparatus 4, and the air showering apparatus 5 are positioned on a same horizontal straight line on a same plane. Therefore, when the electrode fixing clips 6 move in the three apparatuses, the vertical transfer mechanism 21 does not work, and the horizontal transfer mechanism 22 and the clamping transfer mechanism 23 are in action, which saves time caused by displacement and increases the test speed.

4. Test Apparatus 3

The test apparatus 3 is a main structure for testing the detection electrode plate 61, and includes a liquid immersion tank 31 and a test board 32. A test solution for testing is injected into the liquid immersion tank 31. During testing, the electrode fixing clips 6 are inserted into insertion grooves in two sides of the liquid immersion tank 31. Bosses are arranged on the insertion grooves, such that the protrusions at the two ends of each electrode fixing clip 6 are clamped on the bosses, and a tip of the detection electrode plate 61 extends into the test solution of the liquid immersion tank 31. A front end and a back end of the liquid immersion tank 31 are respectively provided with the test board 32, an auxiliary clamping plate 33, and related components thereof. The auxiliary clamp plate 33 and the test board 32 clamp the electrode fixing clips 6 from the front end and the back end. The test board 32 is provided with a plurality of test probes and shielded wires connected to the test probes. During clamping, the test probes are in contact with a test point of the detection electrode plate 61, and the auxiliary clamping plate 33 plays a stabilization role.

The test board 32 and the auxiliary clamping plate 33 are respectively provided with test slide structures. Each of the sliding structure includes a test slider 34 and a test slide rail 35. The test board 32 and the auxiliary clamping plate 33 are respectively fixed to the test slide blocks 34 and the test slide rails 35 via test fixing plates. Under the action of a power source (motor or cylinder), the test slide blocks 34 are configured to slide along the test slide rails 35, thereby driving the fixing plates and the test board 32 and the auxiliary clamping plate 33 arranged on the fixing plates to perform reciprocating motion, such that the auxiliary clamping plate 33 and the test board 32 can clamp the detection electrode plate 61 arranged in the liquid immersion tank 31 to complete the testing.

Test information obtained by the test board 32 through the contact between the test probes and the detection electrode plate 61 is transmitted to the computer for testing via the shielded wires to be analyzed. In order to allow the computer to identify a source of the currently obtained test information, a code scanning input unit 36 is arranged at a high point near the test apparatus 3. Single identification codes are arranged at the corners of the electrode fixing clips 6, such that each electrode fixing clip 6 corresponds to a separate identification code; and the identification code corresponds to the detection electrode plate 61 arranged in the electrode fixing clips 6 at that time, such that the identification code is in one-to-one mapping with the detection electrode plate 61. When each electrode fixing clip 6 is fixed in the liquid immersion tank 31, a scanning port of the code scanning input unit 36 is arranged oriented towards a position, where the identification code is arranged, of the electrode fixing clip 6, and the code scanning input unit 36 obtains identification code information of the currently tested electrode fixing clip 6 and sends the information to the computer via wired communication or wireless communication.

The liquid immersion tank 31 is provided with a liquid level sensor. In this embodiment, the liquid level sensor is a laser liquid level sensor, which realizes monitoring of a liquid level of the liquid immersion tank 31. Liquid level information fed back by the liquid level sensor is sent to the computer via wired communication or wireless communication, the computer compares it with a preset liquid level and sends out a liquid replenishment control command, and a liquid replenishment apparatus operates to perform liquid replenishment on the liquid immersion tank 31. The liquid replenishment apparatus includes a liquid inlet tube 38 and a liquid storage tank 37 connected to the liquid immersion tank 31. The liquid storage tank 37 is fixed at a high position of the upper box 11 close to an inner side via an annular positioning frame and a longitudinal positioning plate, and is close to a position where the test apparatus 3 is arranged. A control valve is arranged between the liquid inlet tube 38 and the liquid storage tank 37. The control valve is opened after receiving the liquid replenishment control command. There is a height difference between the liquid storage tank 37 and the liquid immersion tank 31, and a joint of the liquid inlet tube 38 and the liquid immersion tank 31 is relatively low, so under the action of gravity, a liquid in the liquid storage tank 37 flows into the liquid immersion tank 31 to realize liquid replenishment. Until the liquid level fed back from the liquid level sensor to the computer reaches the preset liquid level, the liquid replenishment is stopped when the computer stops sending out the liquid replenishment control command. Through control feedback of the liquid replenishment apparatus and the liquid level sensor, it is ensured that the liquid in the liquid immersion tank 31 may be used for testing.

5. Cleaning Apparatus 4

The cleaning apparatus 4 is of a box-shaped structure; a cleaning tank 41 is arranged in the middle of the cleaning apparatus; insertion grooves for fixing the electrode fixing clips 6 are formed in two sides of the cleaning tank 41; and the insertion grooves are provided with bosses, which are the same as the bosses arranged on the liquid immersion tank 31, such that the electrode fixing clips 6 can be stably clamped in the insertion grooves. Raised inclined blocks are arranged on front and back sides of the cleaning apparatus 4, and a plurality of cleaning nozzles 42 are arranged on an inner side surface of each inclined block. After motor fixing clips are stabilized, the cleaning nozzles 42 are aligned with the detection electrode plate 61 on the motor fixing clips, and the cleaning nozzles 42 spray out purified water to the detection electrode plate 61 to realize cleaning.

The cleaning nozzles 42 are connected to a purified water storage tank arranged at the lower box 12 via water tubes. By valve bodies arranged inside the apparatus and corresponding cleaning control modules arranged in the computer, the spray flow rate of the cleaning nozzles 42, the spray time, and the position of a switch for controlling a single cleaning nozzle 42 are controlled to complete timed and positioned cleaning of the detection electrode plate 61. The purified water after cleaning flows into the cleaning tank 41. A recovery pipeline is arranged in the tank. The cleaning tank is connected to a waste liquid tank of the lower box 12 via the recovery pipeline.

6. Air Showering Apparatus 5

The air showering apparatus 5 is similar to the cleaning apparatus 4; an air showering tank 51 is arranged in the middle of the air showering apparatus; and insertion grooves for fixing the electrode fixing clips 6 are formed in two sides of the air showering apparatus, such that the electrode fixing clips 6 can be stably clamped in the insertion grooves. Raised inclined blocks are arranged on front and back sides of the air showering tank 51, and a plurality of air showering micro-holes 52 are formed in an inner side surface of each inclined block. A fan is arranged inside the apparatus, and air is supplied to the air showering micro-holes 52 via air supply ducts to be blown out. The air showering micro-holes 52 are aligned with the detection electrode plate 61 to perform air showering, thereby realizing all-directional drying of the cleaned detection electrode plate 61. The process is the same as the process for the cleaning apparatus 4. An air showering module is controlled by the computer to control air showering time, air speed, and positioned drying realized by control of a single air showering micro-hole 52.

In addition, the air showering tank 51 is also provided with a recovery pipeline to recover the purified water dropping from the detection electrode plate 61.

The above are only the preferred embodiments of the present disclosure and are not intended to limit the present disclosure. Any modifications, equivalent substitutions and improvements, etc. made within the spirit and principle of the present disclosure shall be included in the scope of protection of the present disclosure.

What is claimed is:

1. An automatic sensor screening and detection device, comprising: a box and
    transfer mechanisms arranged in the box, the transfer mechanisms being configured to drive a detection electrode plate to move in the box, the transfer mechanisms configured to clamp the detection electrode plate to a clamping piece carrier tray, and sequentially move the detection electrode plate to a test apparatus, a cleaning apparatus, an air showering apparatus, and to return the detection electrode plate returns to the clamping piece carrier tray;
    the test apparatus is provided with a liquid immersion tank and a test board, during testing, the detection electrode plate is configured to be immersed in the liquid immersion tank, during clamping, test probes arranged on the test board are configured to be in contact with the detection electrode plate, and the test probes are connected to a computer via shielded wires;
    the cleaning apparatus comprises a cleaning tank and cleaning nozzles, the cleaning nozzles being aligned with the detection electrode plate to perform spray cleaning with purified water; and
    the air showering apparatus comprises an air showering tank and air showering micro-holes, the air showering micro-holes being aligned with the detection electrode plate to perform air showering drying.

2. The automatic sensor screening and detection device according to claim 1, wherein the transfer mechanisms comprise a vertical transfer mechanism, a horizontal transfer mechanism, and a clamping transfer mechanism, the clamping transfer mechanism is arranged on the horizontal transfer mechanism, the horizontal transfer mechanism is arranged on the vertical transfer mechanism, and the transfer mechanisms are configured to drive the detection electrode plate to move in the box in a three-dimensional space.

3. The automatic sensor screening and detection device according to claim 2, wherein the box is provided with a profile steel frame, the vertical transfer mechanism is arranged on the profile steel frame, the vertical transfer mechanism comprises a vertical guide rail, a vertical transfer screw rod, and a vertical transfer slide rail, the vertical transfer screw rod is connected to a first vertical transfer slide block, the first vertical transfer slide block is connected to one end of a moving plate, an end part of the vertical transfer screw rod is connected to a vertical transfer motor, and another end of the moving plate is slidably connected to the vertical transfer slide rail via a second vertical transfer slide block.

4. The automatic sensor screening and detection device according to claim 3, wherein the moving plate is arranged on the horizontal transfer mechanism, the moving plate is provided with a horizontal guide rail and a horizontal transfer screw rod, a horizontal transfer slide block is arranged on the horizontal transfer screw rod, one end of the horizontal transfer screw rod is connected to a horizontal transfer motor, and the horizontal transfer slide block is configured to slide along the horizontal guide rail.

5. The automatic sensor screening and detection device according to claim 1, wherein an auxiliary clamping plate and the test board are respectively arranged on opposite sides of the liquid immersion tank, both the auxiliary clamping plate and the test board are connected to test slide structures, each of the test slide structures comprises a test slide block and a test slide rail, the test board and the auxiliary clamping plate are respectively fixed to the test slide blocks and the test slide rails via test fixing plates, and the test slide blocks are configured to slide along the test slide rails so as to be capable of driving the fixing plates and the test board and the auxiliary clamping plate arranged on the fixing plates to perform reciprocating motion.

6. The automatic sensor screening and detection device according to claim 1, wherein the test apparatus is provided with a code scanning input unit, the code scanning input unit is connected to the computer, the detection electrode plate is configured to be placed in electrode fixing clips, each of the electrode fixing clips is provided with an identification code, and the code scanning input unit is arranged oriented towards a position where the identification code is located when the corresponding electrode fixing clip is placed in the liquid immersion tank.

7. The automatic sensor screening and detection device according to claim 1, wherein the cleaning apparatus comprises the cleaning tank and the plurality of cleaning nozzles arranged on two sides of the cleaning tank, the cleaning nozzles are connected to a purified water storage tank, a control valve is arranged between the purified water storage tank and each of the cleaning nozzles, and the computer is connected to the control valve.

8. The automatic sensor screening and detection device according to claim 1, wherein the air showering apparatus comprises the air showering tank and the plurality of air showering micro-holes are formed in two sides of the air showering tank, the air showering micro-holes are connected to a fan, and the computer is connected to the fan.

* * * * *